(12) United States Patent
Zhang et al.

(10) Patent No.: US 9,803,773 B2
(45) Date of Patent: Oct. 31, 2017

(54) OIL-GAS DUAL-PURPOSE INTEGRATED SWITCH

(71) Applicant: Chongqing Rato Technology Co., Ltd., Chongqing (CN)

(72) Inventors: Bo Zhang, Chongqing (CN); Quan Yang, Chongqing (CN); Wen-Bin Zhou, Chongqing (CN); Jin-Hua Du, Chongqing (CN)

(73) Assignee: CHONGQING RATO TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/146,361

(22) Filed: May 4, 2016

(65) Prior Publication Data

US 2017/0159841 A1    Jun. 8, 2017

(30) Foreign Application Priority Data

Dec. 8, 2015  (CN) .......................... 2015 1 0896763

(51) Int. Cl.
*F02D 41/22*  (2006.01)
*F16K 31/06*  (2006.01)

(52) U.S. Cl.
CPC .................................. *F16K 31/06* (2013.01)

(58) Field of Classification Search
CPC .. F16K 31/06; F16K 31/0603; F16K 31/0606; F02M 37/0023; F02M 37/0064; F02N 19/001; F01M 1/24; F01M 1/26; F02P 11/02; F02P 11/025; F02D 19/06; F02D 19/0602; F02D 19/0613

USPC ... 123/73 AD, 510, 515, 605, 179.5, 179.16, 123/198 D, 198 DB, 198 DC, 575, 525
See application file for complete search history.

(56) References Cited

U.S. PATENT DOCUMENTS

| | | | | |
|---|---|---|---|---|
| 4,077,381 A | * | 3/1978 | Firey ..................... | F02D 33/006 123/179.16 |
| 4,278,056 A | * | 7/1981 | Davis ...................... | F01P 11/16 123/198 D |
| 4,574,763 A | * | 3/1986 | Hallberg ................. | F02B 43/00 123/527 |
| 5,493,086 A | * | 2/1996 | Murphy, Jr. ......... | F01M 11/061 137/399 |
| 7,967,005 B2 | * | 6/2011 | Parrish ................ | A47J 37/0713 126/39 N |
| 8,757,139 B2 | * | 6/2014 | Deng .................. | F16K 11/0836 126/58 |
| 9,353,712 B2 | * | 5/2016 | Matsukawa ........ | F02M 37/0023 |

(Continued)

*Primary Examiner* — Hai Huynh
(74) *Attorney, Agent, or Firm* — Cheng-Ju Chiang

(57) ABSTRACT

The present invention discloses an oil-gas dual-purpose integrated switch. The oil-gas dual-purpose integrated switch comprises a valve and a knob switch for controlling an ignition coil and a carburetor solenoid valve; the valve cap is fixed on the valve body to form a valve cavity; the valve core is disposed in the valve body; the valve core passes through the valve cap to be fixed with the knob of the knob switch such that when the knob switch is rotated, the valve core is driven to rotate; the valve body is provided with an oil inlet pipe joint, an oil outlet pipe joint, a gas inlet pipe joint and a gas outlet pipe joint which are communicated with the valve cavity; the valve core is provided with an oil duct, and a gas duct. The oil-gas dual-purpose integrated switch can switch the oil path and the gas path randomly.

10 Claims, 4 Drawing Sheets

(56) References Cited

U.S. PATENT DOCUMENTS

| | | | |
|---|---|---|---|
| 2007/0007482 A1* | 1/2007 | DeHaan | F16K 5/0242 |
| | | | 251/310 |
| 2012/0240900 A1* | 9/2012 | Laitala | B60K 15/03504 |
| | | | 123/445 |
| 2013/0291825 A1* | 11/2013 | Sloan | F02D 17/04 |
| | | | 123/198 DC |

* cited by examiner

OIL-GAS DUAL-PURPOSE INTEGRATED SWITCH

BACKGROUND OF THE INVENTION

Technical Field

The present invention relates to the technical field of fuel supply systems for oil-gas dual-purpose power generators, in particular to an oil-gas dual-purpose integrated switch.

Description of Related Art

At present, oil-gas dual-purpose generator fuel supply systems available on the market are switched in two modes. One is that, oil and gas paths are controlled by two individual valves; the valves have no direct connection; to switch to the other fuel status to run a power generator, the power generator must be stopped first, while operators are required to have certain working experience to ensure that the power generator runs stably after the switching; the other is that the oil path and the gas path are still controlled by two independent valves which are linked by a mechanical structure. When one valve opens, the other is linked to close. Such structure needs many actions to perform the switching, so it is also difficult to realize random switching between the oil and gas during operation of the power generator. In the above two structures, the valve and the stop switch of the power generator are not in a direct relationship, so if the operator does not close the gas path after shutting down the power generator, safety accidents tend to occur.

BRIEF SUMMARY OF THE INVENTION

The technical problem to be solved in the present invention is to provide an oil-gas dual-purpose integrated switch capable of randomly switching between oil and gas paths.

To solve the above problem, the present invention provides an oil-gas dual-purpose integrated switch. The oil-gas dual-purpose integrated switch includes a valve and a knob switch for controlling an ignition coil and a carburetor solenoid valve; the knob switch has a knob which can be rotated to control the ignition coil to perform earthing or powering off the carburetor; the valve includes a valve body, a valve core and a valve cap; the valve cap is fixed on the valve body to form a valve cavity; the valve core is disposed in the valve body; the valve core passes through the valve cap to be fixed with the knob of the knob switch such that when the knob switch is rotated, the valve core is driven to rotate; the valve body is provided with an oil inlet pipe joint, an oil outlet pipe joint, a gas inlet pipe joint and a gas outlet pipe joint which are communicated with the valve cavity; the valve core is provided with an oil duct which is communicated with the oil inlet pipe joint and the oil outlet pipe joint, and a gas duct which is communicated with the gas inlet pipe joint and the gas outlet pipe joint.

Further, at least one positioner is disposed between the valve core and the valve cap; the positioner comprises an elastic member and a positioning member; an end face, contacting the valve cap, of the valve core is provided with an accommodating cavity equivalent to the positioner; an end face, contacting the valve core, of the valve cap is provided with at least three positioning holes; the elastic member and the positioning member are both disposed in the accommodating cavity; and the positioning member is matched with the positioning hole.

Further, the valve core and the valve body are in a clearance fit.

Further, the valve core comprises a valve core body and a valve core sleeve; the valve core sleeve is sleeved on the valve core body; the valve core sleeve is provided with two through-holes corresponding to a gas duct of the valve core body; and the two ends of the valve core sleeve are provided with projections.

Further, the valve body is also provided with a fuel oil settling chamber; the fuel oil settling chamber is disposed between one of the fuel oil joints and the valve cavity; the valve body is provided with an oil duct such that the fuel oil settling chamber is communicated with the valve cavity, while the fuel oil settling chamber is communicated with the fuel oil joint; and the fuel oil settling chamber is internally provided with a filter screen for filtering the fuel oil.

Further, the fuel oil settling chamber consists of a settling tank, a sealing ring and a settling cup which are disposed on the valve body; the settling cup and the settling tank are in detachable connection; and the sealing ring is disposed between the settling tank and the settling cup to perform sealing.

Further, the valve also comprises a rubber pad provided with two through-holes; the rubber pad is disposed at the bottom inside the valve cavity, and located between the valve core and the valve body.

Further, the knob switch comprises a knob, a first microswitch, a second microswitch, a cam, a panel and a support; the cam is penetrated by the knob; the knob is fixed to the valve core; the first microswitch and the second microswitch are both disposed on the support; the cam is located between the first microswitch and the second microswitch; the support is fixed on the panel; and the first microswitch is normally on.

Further, the support comprises a support main body, two fixed legs and at least two supporting legs fixed to the panel; the two fixed legs are disposed on two sides of the support main body; and the first microswitch and the second microswitch are respectively fixed at the two fixed legs.

Further, the panel is provided with gear marks.

The oil-gas dual-purpose integrated switch of the present invention controls the on-off of the oil path and the gas path through rotating the vale core, and the valve core is directly connected with the knob of the knob switch, so the valve core rotates together with the knob. When the oil path is switched on, the ignition coil is not earthed and can perform igniting, and the carburetor solenoid valve is powered off while the main measuring hole of the carburetor opens, and in this way, the fuel oil can be transmitted to the carburetor cup of the engine. When the gas path is switched on, the carburetor throat opens, and the ignition coil can perform igniting without earthing; the carburetor solenoid valve is electrified, and the main measuring hole of the carburetor is closed, thus avoiding mixing of the oil and gas and ensuring stable operation. The knob and the valve core directly perform transmission without a linkage mechanism, and during switching from the oil path to the gas path or switching from the gas path to the oil path, the ignition coil is powered off for a moment and then electrified again, and the engine does not shut down and can continue to run due to the inertia effect, so no experience is required to perform the switching, and the switching is stable and random. At the same time, when the knob switch is turned to the OFF position, the oil duct and the gas duct are both closed, and the ignition coil is earthed and cannot perform ignition, thus ensuring safety.

DETAILED DESCRIPTION OF THE INVENTION

The present invention is described in further detail with reference to the attached drawings.

Embodiment 1

Figure 1:
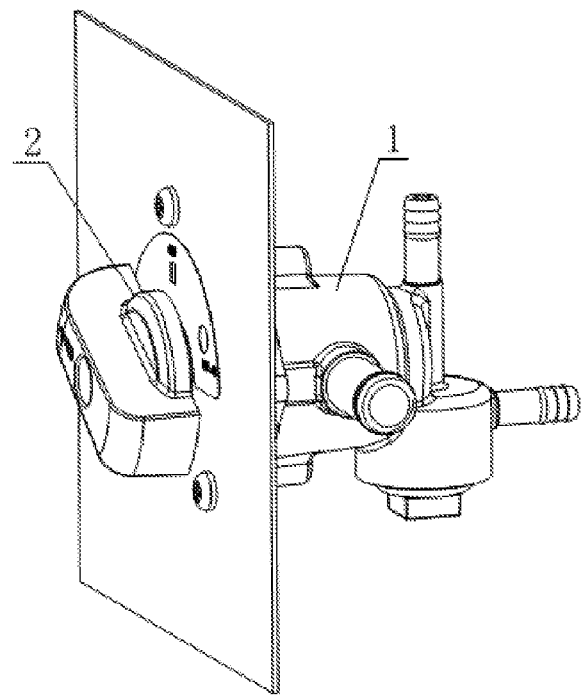
FIG. 1 is a structural view of a preferable embodiment of an oil-gas dual-purpose integrated switch of the present invention.
Figure 2:
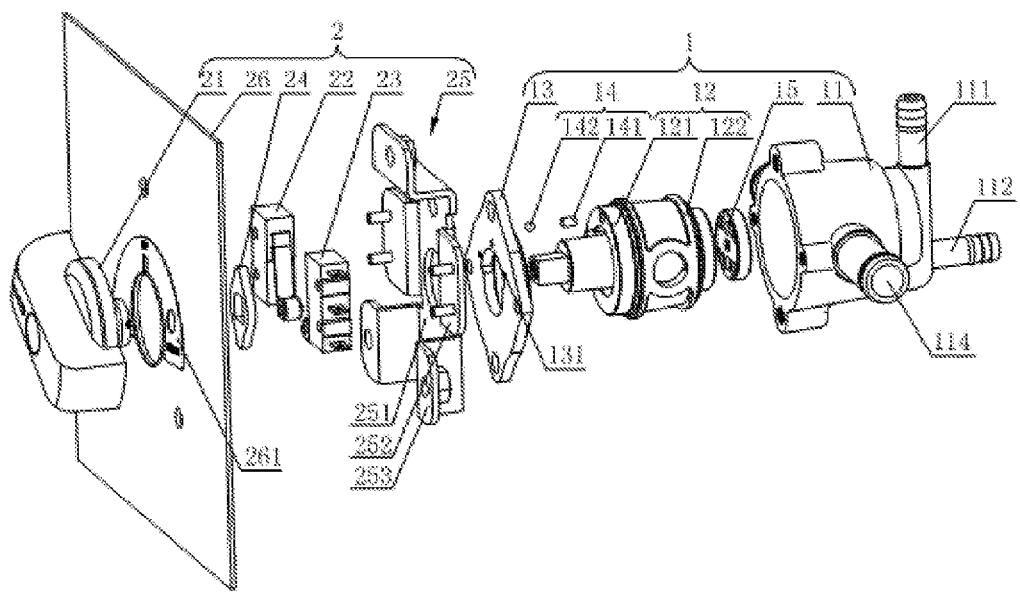
FIG. 2 is an exploded view of the oil-gas dual-purpose integrated switch.

As shown in FIGS. 1 and 2, in a preferable embodiment, the oil-gas dual-purpose integrated switch of the present invention comprises a valve 1, and a knob switch 2 for controlling an ignition coil 3 and a carburetor solenoid valve 4; the knob switch 2 has a knob 21 which is rotated to control the ignition coil 3 to perform earthing and powering off the carburetor; and the knob 21 is fixed to the valve core 12 of the valve 1.

Figure 3:
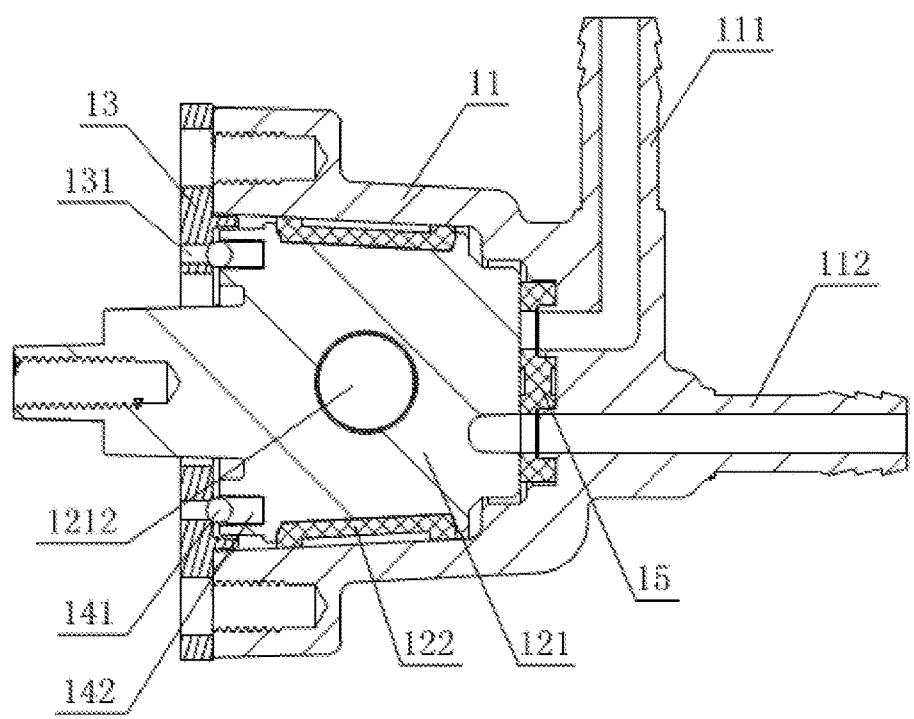
FIG. 3 is a sectional view of the valve.
Figure 4:
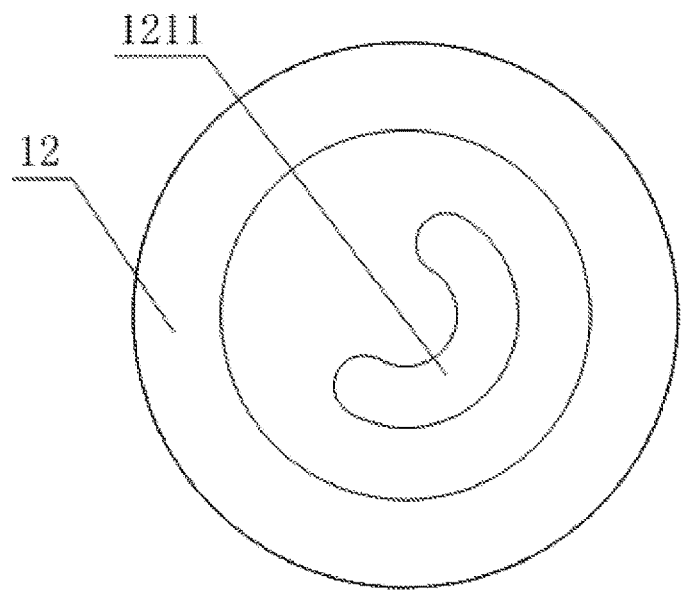
FIG. 4 is a structural view of a valve core.

Refer to FIG. 3 and FIG. 4. The valve 1 comprises a valve body 11, a valve core 12, a positioner 14 and a valve cap 13. The valve cap 13 is fixed on the valve body 11 to form a valve cavity; the valve core 12 is disposed in the valve body 11; the valve core 12 and the valve body 11 are in a clearance fit to ensure the sealing effect. The valve core 12 passes through the valve cap 13 and is fixed to the knob 21 of the knob switch 2 such that the knob switch 2 drives the valve core 12 to rotate during rotation. The positioner 14 is disposed between the valve core 12 and the valve cap 13 to quickly position the rotating position of the valve core 12.

The valve body 11 is provided with an oil inlet pipe joint 111, an oil outlet pipe joint 112, a gas inlet pipe joint 113 and a gas outlet pipe joint 114 which are communicated with the valve cavity; axial lines of the gas inlet pipe joint 113 and the gas outlet pipe joint 114 are superposed, namely on the same straight line without turning, thus ensuring sufficient gas supply during gas status and small pressure drops. The oil inlet pipe joint 111 and the oil outlet pipe joint 112 are disposed at the bottom of the valve body 11, while the gas inlet pipe joint 113 and the gas outlet pipe joint 114 are disposed in the middle of the valve body 11, which are conveniently distinguished. In other embodiments, the oil inlet pipe joint 111, the oil outlet pipe joint 112, the gas inlet pipe joint 113 and the gas outlet pipe joint 114 can all be disposed in the middle of the valve body 11.

The valve core 12 is provided with an oil duct 1211 for connecting the oil inlet pipe joint 111 with the oil outlet pipe joint 112, and a gas duct 1212 for connecting the gas inlet pipe joint 113 with the gas outlet pipe joint 114. The valve core 12 includes a valve core body 121 and a valve core sleeve 122; the valve core sleeve 122 is sleeved on the valve core body 121; and the valve core sleeve 122 is provided with two through-holes corresponding to the air duct 1212 of the valve core body 121. The valve core sleeve 122 is made of rubber, in close fit with the valve body 11 and the valve core 12 by elastic potential, thus effectively preventing the oil and gas from convecting and preventing the gas from leaking. The two ends of the valve core sleeve 122 are provided with projections, reducing the contact area between the valve core 12 and the vale body 11, thus reducing the friction between the valve core 12 and the valve body 11 during rotation. The valve core body 121 is cone-shaped, facilitating assembling. An end face, contacting the valve cap 13, of the valve core 12 is provided with an accommodating cavity. Specifically speaking, the end face, contacting the valve cap 13, of the valve core body 121 is provided with an accommodating cavity. The end face, contacting the valve core 12, of the valve cap 13 is provided with three positioning holes 131.

Figure 5:
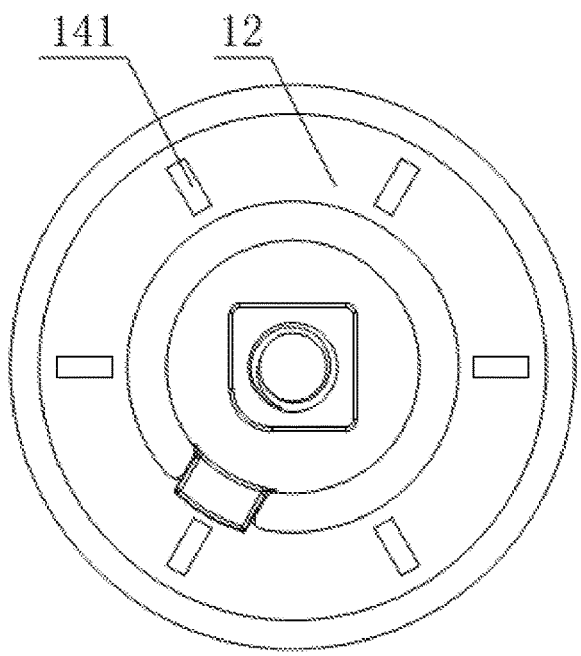
FIG. 5 is a structural view of another preferable embodiment of a positioning member.

Refer to FIG. 2. The positioner 14 includes an elastic element 141 and a positioning member 142. The elastic member 141 and the positioning member 142 are both disposed in the accommodating cavity of the valve body 121. The positioning member 142 is matched with the positioning hole 131, which means that the two ends of the elastic member 141 are respectively pressed against the bottom of the accommodating cavity in which the positioning member 142 and the valve core body 121 are disposed. In this embodiment, the elastic member 141 is a rubber column, and the positioning member 142 is a spherical steel ball. The positioner 14 can quickly position the valve core 12 such that the flow of the fuel or gas reaches the maximum, or quickly switch off the oil path and gas path. In other embodiments, the positioner 142 may be a steel stud with an arc-shaped end, or a cylinder (as shown in FIG. 5), and the axial line of the cylinder is parallel to the end face of the valve core body 121.

A rubber pad 15 with two through-holes is disposed between the valve body 11 and the valve core 12. The rubber pad 15 is disposed at the bottom in the valve cavity and is fixed at the bottom of the valve cavity, while the two through-holes respectively correspond to the oil inlet pipe joint 111 and the oil outlet pipe joint 112. In other embodiments, the rubber pad 15 can also be fixed on the valve core 12, and the two through-holes are matched with the oil inlet pipe joint 111 and the oil outlet pipe joint 112 on the valve body 11.

Figure 6:
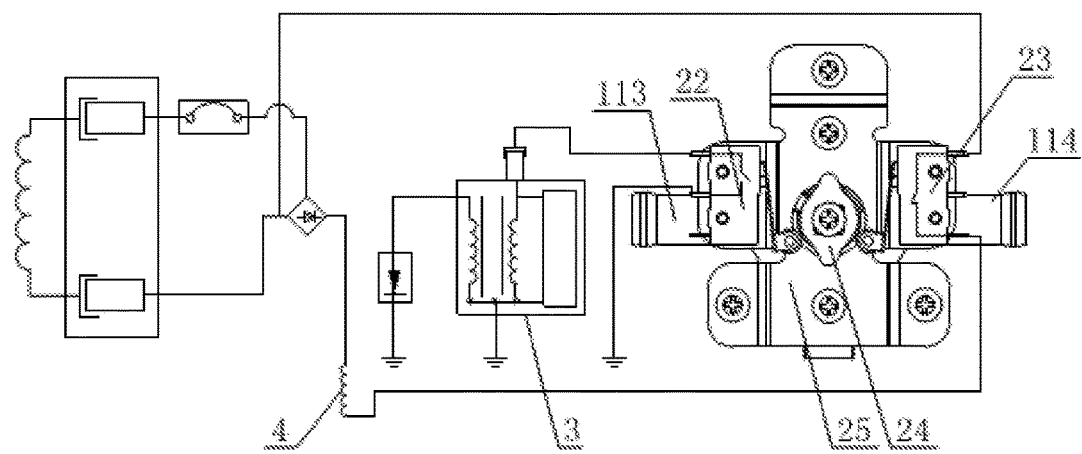
FIG. 6 is a circuit diagram of the oil-gas dual-purpose integrated switch.

Refer to FIGS. 2 and 6. The knob switch 2 includes a knob 21, a first microswitch 22, a second microswitch 23, a cam 24, a panel 26 and a support 25. The cam 24 is penetrated by the knob 21, and the knob 21 is fixed to the valve core 12 through a screw. The first microswitch 22 and the second microswitch 23 are both disposed on the support 25. The cam 24 is located between the first microswitch 22 and the second microswitch 23, and the support 25 is fixed on the panel 26. The first microswitch 22 is normally on, while the second microswitch 23 is normally off. The first microswitch 22 is used for controlling the ignition coil 3 to perform earthing or not, while the second microswitch 23 is used for controlling the carburetor solenoid valve 4 to switch on or off.

The support 25 includes a support main body 251, two fixed legs 252 and three supporting legs 253 fixed to the panel 26; the two fixed legs 252 are disposed on two sides of the support main body 251; and the first microswitch 22 and the second microswitch 23 are respectively fixed at the two fixed legs 252. The panel 26 is provided with gear marks 261, namely oil gear, gas gear and OFF gear.

When the knob 21 is located at the OFF gear, the cam 24 presses the first microswitch 22 such that the ignition coil 3 is earthed, which means that ignition is impossible. In such circumstances, the second microswitch 23 is in the off status, while the oil path and the gas path are both closed, thus ensuring safety. When the knob 21 is rotated leftward to the gas gear, the knob 21 drives the cam 24 to rotate leftward to press the second microswitch 23, and the first microswitch 22 turns off; when the valve core 12 is turned to rotate leftward, the gas duct 1212 in the valve core 12 is communicated with the gas inlet pipe joint 113 and the gas outlet pipe joint 114, and in such circumstances, the steel ball is located in the positioning hole 131 corresponding to the valve cap 13. The gas inlet pipe joint 113 is communicated with the gas outlet pipe joint 114 such that the gas enters the throat of the carburetor. The first microswitch 22 turns off such that the ignition coil 3 thereof is electrified to perform igniting, and the second microswitch 23 turns off such that the gas control circuit thereof is electrified, which means that the fuel solenoid valve 4 in the carburetor is electrified, and the shaft pin of the solenoid valve 4 moves upward to block the main measuring hole of the carburetor and cut off the oil path in the carburetor. In such circumstances, only a single path of gas enters, thus preventing the fuel oil and the gas from mixing and burning, and ensuring the stable operation of the whole machine. When the knob 21 is rotated rightward to the gas gear, the knob 21 drives the cam 24 to rotate rightward such that both the first microswitch 22 and the second microswitch 23 are not pressed, while the valve core 12 is driven to rotate rightward such that the oil duct 1211 in the valve core 12 connects the oil inlet pipe joint 111 with the oil outlet pipe joint 112, and in such circumstances, the steel ball is located in the positioning hole 131 corresponding to the valve cap 13. The first microswitch 22 is set to be normally on, and then the ignition coil 3 can perform igniting when electrified. The second microswitch 23 is set to be normally off, and then the carburetor solenoid valve 4 is powered off and the main measuring hole of the carburetor opens; and the oil inlet pipe joint 111 is communicated with the oil outlet pipe joint 112 such that the fuel oil enters the carburetor cup.

When the gear is switched from the fuel oil gear to the gas gear, or when the gear is switched from the gas gear to the fuel oil gear, the switching time is very short, and the ignition coil 3 is powered off for a moment and then electrified again, so the engine does not shut down and can continue to run due to the inertia effect. No experience is required to perform the switching, and the switching is stable and random.

Embodiment 2

Figure 7:
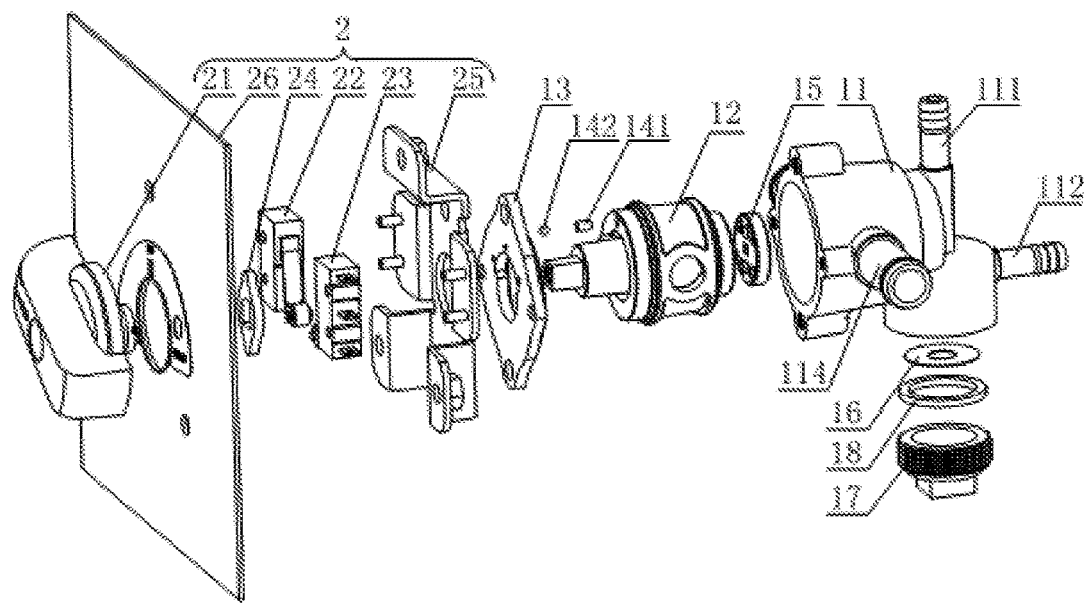
FIG. 7 is a structural view of another preferable embodiment of the oil-gas dual-purpose integrated switch of the present invention.
Figure 8:
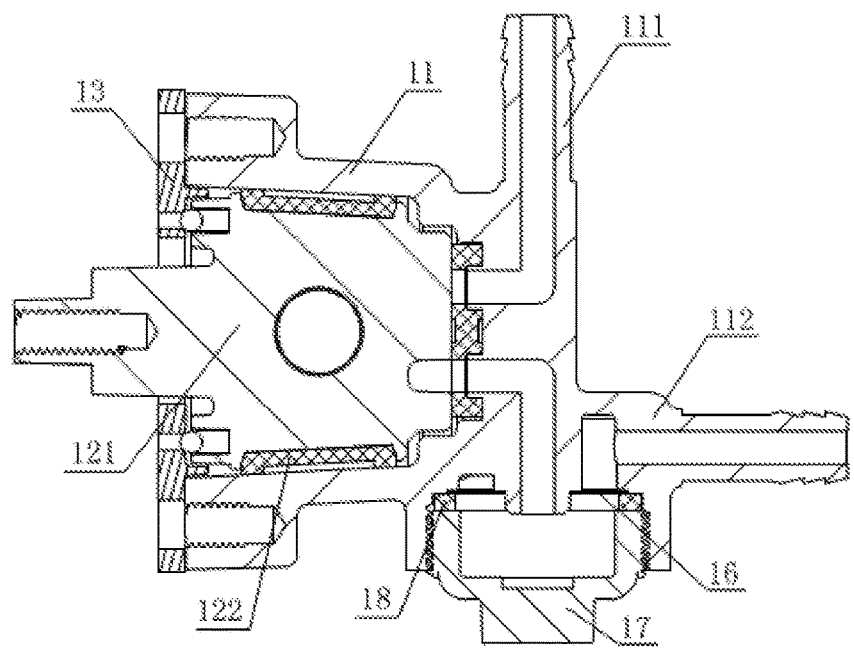
FIG. 8 is a sectional view of the valve body in FIG. 7.

As shown in FIGS. 7 and 8, this embodiment is different from embodiment 1 in that the valve body 11 is also provided with a fuel oil settling chamber, and the other parts are the same.

The fuel oil settling chamber is disposed between the fuel oil pipe joint (the oil inlet pipe joint 111 and the oil outlet pipe joint 112 are generally called the fuel oil pipe joint) and the valve cavity. The valve body 11 is provided with an oil duct such that the fuel oil setting chamber is communicated with the valve cavity, and the fuel oil settling chamber is communicated with the fuel oil pipe joint. Specifically speaking, the fuel oil settling chamber is disposed between the oil outlet pipe joint 112 and the valve cavity, and the fuel oil settling chamber is communicated with the oil outlet pipe joint 112. The fuel oil settling chamber is internally provided with a filter screen 16 for filtering fuel oil, and the filter screen 16 is fixed on the oil duct on the valve body 11. The fuel oil settling chamber consists of a settling tank and a settling cup 17 on the valve body 11. The settling cup 17 is connected with the settling tank through screw threads such that the settling cup 17 can be removed from the valve body 11, and then the impurities left on the settling cup 17 by the filter screen 16 can be washed away. In other embodiments, the settling cup 17 may be connected with the settling tank through screws, and a sealing ring 18 is also disposed between the settling cup 17 and the settling tank. In other embodiments, the filter screen 16 can be removed, so natural settling occurs.

Embodiment 3

This embodiment is different from embodiment 2 in the quantity of the positioner 14.

In this embodiment, two positioners 14 are provided. The end face, contacting the valve cap 13, of the valve core 12 is provided with two accommodating cavities, and the end face, contacting the valve core 12, of the valve cap 13 is provided with six positioning holes 131. In other embodiments, six positioners 14 may be provided.

The above are only some embodiments of the present invention and shall not be regarded as limits to the present invention. Any equivalent structures made on the basis of the description and attached drawings of the present invention, or direct or indirect application to other related fields, shall fall within the protective scope of the present invention.

What is claimed is:

1. An oil-gas dual-purpose integrated switch, wherein said oil-gas dual-purpose integrated switch comprises a valve and a knob switch for controlling an ignition coil and a carburetor solenoid valve; the knob switch has a knob which can be rotated to control the ignition coil to perform earthing or powering off the carburetor; the valve comprises a valve body, a valve core and a valve cap; the valve cap is fixed on the valve body to form a valve cavity; the valve core is disposed in the valve body; the valve core passes through the valve cap to be fixed with the knob of the knob switch such that when the knob switch is rotated, the valve core is driven to rotate; the valve body is provided with an oil inlet pipe joint, an oil outlet pipe joint, a gas inlet pipe joint and a gas outlet pipe joint which are communicated with the valve cavity; the valve core is provided with an oil duct which is communicated with the oil inlet pipe joint and the oil outlet pipe joint, and a gas duct which is communicated with the gas inlet pipe joint and the gas outlet pipe joint.

2. The oil-gas dual-purpose integrated switch according to claim 1, wherein at least one positioner is disposed between the valve core and the valve cap; the positioner comprises an elastic member and a positioning member; an end face, contacting the valve cap, of the valve core is provided with an accommodating cavity equivalent to the positioner; an end face, contacting the valve core, of the valve cap is provided with at least three positioning holes; the elastic member and the positioning member are both disposed in the accommodating cavity; and the positioning member is matched with the positioning hole.

3. The oil-gas dual-purpose integrated switch according to claim 1, wherein the valve core and the valve body are in a clearance fit.

4. The oil-gas dual-purpose integrated switch according to claim 1, wherein the valve core comprises a valve core body and a valve core sleeve; the valve core sleeve is sleeved on the valve core body; the valve core sleeve is provided with two through-holes corresponding to a gas duct of the valve core body; and the two ends of the valve core sleeve are provided with projections.

5. The oil-gas dual-purpose integrated switch according to claim 1, wherein the valve body is also provided with a fuel oil settling chamber; the fuel oil settling chamber is disposed between one of the fuel oil joints and the valve cavity; the valve body is provided with an oil duct such that the fuel oil settling chamber is communicated with the valve cavity, while the fuel oil settling chamber is communicated with the fuel oil joint; and the fuel oil settling chamber is internally provided with a filter screen for filtering the fuel oil.

6. The oil-gas dual-purpose integrated switch according to claim 5, wherein the fuel oil settling chamber consists of a settling tank, a sealing ring and a settling cup which are disposed on the valve body; the settling cup and the settling tank are in a detachable connection; and the sealing ring is disposed between the settling tank and the settling cup to perform sealing.

7. The oil-gas dual-purpose integrated switch according to claim 1, wherein the valve also comprises a rubber pad provided with two through-holes; the rubber pad is disposed at the bottom inside the valve cavity, and located between the valve core and the valve body.

8. The oil-gas dual-purpose integrated switch according to claim 1, wherein the knob switch comprises a knob, a first microswitch, a second microswitch, a cam, a panel and a support; the cam is penetrated by the knob; the knob is fixed to the valve core; the first microswitch and the second microswitch are both disposed on the support; the cam is located between the first microswitch and the second microswitch; the support is fixed on the panel; and the first microswitch is normally on.

9. The oil-gas dual-purpose integrated switch according to claim 8, wherein the support comprises a support main body, two fixed legs and at least two supporting legs fixed to the panel; the two fixed legs are disposed on two sides of the support main body; and the first microswitch and the second microswitch are respectively fixed at the two fixed legs.

10. The oil-gas dual-purpose integrated switch according to claim 1, wherein the panel is provided with gear marks.

* * * * *